United States Patent [19]

Palum et al.

[11] Patent Number: 4,988,886
[45] Date of Patent: Jan. 29, 1991

[54] MOIRE DISTANCE MEASUREMENT METHOD AND APPARATUS

[75] Inventors: Russell J. Palum, Pittsford; John E. Greivenkamp, Rochester, both of N.Y.

[73] Assignee: Eastman Kodak Company, Rochester, N.Y.

[21] Appl. No.: 334,421

[22] Filed: Apr. 6, 1989

[51] Int. Cl.$^5$ .............................................. G01N 21/86
[52] U.S. Cl. ......................................... 250/561; 356/4
[58] Field of Search ............ 250/561, 201 AF, 201 R; 356/1, 4, 374, 376; 354/403

[56] References Cited

U.S. PATENT DOCUMENTS

| | | | |
|---|---|---|---|
| 3,245,307 | 4/1966 | DeLang | 356/374 |
| 3,572,942 | 3/1971 | Tekronnie et al. | 356/154 |
| 3,663,107 | 5/1972 | Denis et al. | 356/371 |
| 3,759,618 | 9/1973 | Rogers et al. | 356/372 |
| 4,051,483 | 9/1977 | Suzuki | 346/33 A |
| 4,125,025 | 11/1978 | Suzuki et al. | 73/655 |
| 4,212,075 | 7/1980 | Balasubramanian | 364/562 |
| 4,272,196 | 6/1981 | Indebetouw | 356/371 |
| 4,488,172 | 12/1984 | Hutchin | 358/107 |
| 4,499,492 | 2/1985 | Hutchin | 358/107 |
| 4,525,858 | 6/1985 | Cline et al. | 382/1 |
| 4,614,864 | 9/1986 | Wu | 250/201 |
| 4,673,817 | 6/1987 | Oomen | 250/561 |
| 4,722,605 | 2/1988 | Livnat et al. | 356/374 |
| 4,776,698 | 10/1988 | Crossdale | 356/345 |
| 4,794,550 | 12/1988 | Greivenkamp, Jr. | 364/562 |

FOREIGN PATENT DOCUMENTS 58-35406 3/1983 Japan.

Primary Examiner—David C. Nelms
Attorney, Agent, or Firm—Thomas H. Close

[57] ABSTRACT

A Moire distance measurement technique for measuring the distance that a diffusely reflecting surface moves involves projecting a first grating onto the surface, imaging the projected grating onto a second grating to form a Moire pattern, and measuring a change in the Moire pattern as the surfaces move to determine the distance that the surface has moved.

10 Claims, 1 Drawing Sheet

MOIRE DISTANCE MEASUREMENT METHOD AND APPARATUS

TECHNICAL FIELD

This invention is directed to methods and apparatus for measuring distances, and more particularly to such methods and apparatus wherein a Moire pattern is employed in the distance measurement.

BACKGROUND OF THE INVENTION

U.S. Pat. No. 4,722,605 issued Feb. 2, 1988 to Livnat et al. shows Moire distance measurement method and apparatus useful for noncontact measurement of small displacements of a specularly reflecting surface with a high degree of accuracy. The technique described by Livnat et al. involves projecting a collimated beam of light through a first grating onto the specularly reflecting surface. The light reflected by the surface is modulated by a second grating rotated at an angle $\theta$ with respect to the first grating to form a Moire pattern. A displacement of the surface causes the Moire pattern to shift. The shift in the Moire pattern is detected to measure the distance moved by the surface.

According to this method, a relatively large area of the surface being measured needs to be relatively flat and specularly reflective. This method is very useful for measuring the surfaces of liquids, and sheet materials such as plate glass. However, in an automated manufacturing environment it is often desirable to accurately measure the small displacement of parts that do not have relatively large specularly reflective surfaces.

Accordingly, it is the object of the present invention to provide a Moire distance measurement method and apparatus for measuring the displacement of a diffusely reflective surface.

SUMMARY OF THE INVENTION

The object of the invention is achieved by performing Moire distance measurement by projecting an image of a first grating onto a diffusely reflecting surface. An image of the projected image is formed on a second grating to generate a Moire pattern. A change in the Moire pattern is sensed to determine the distance moved by the surface. In one embodiment, the image of the projected image is congruent with the second grating whereby a uniform field Moire pattern is produced. Changes in the field from bright to dark are sensed and counted to determine the distance the surface is moved. According to a further embodiment, the accuracy of measurement is improved by employing a phase shifting technique, or a spatial synchronous detection technique.

MODES OF CARRY OUT THE INVENTION

Figure 1:
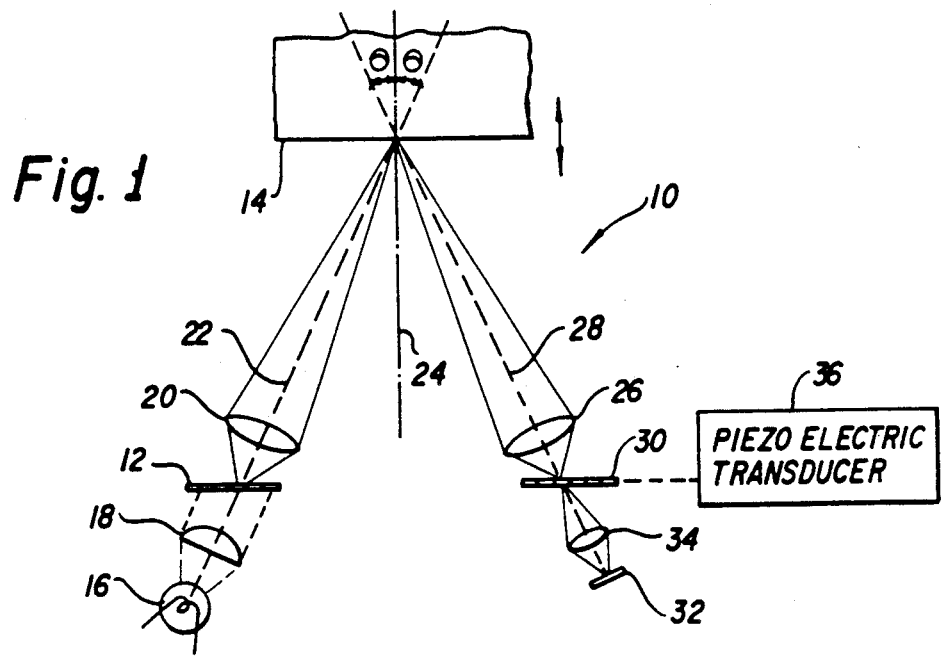
FIG. 1 is a schematic diagram of Moire distance measurement apparatus according to the present invention.

FIG. 1 is a schematic diagram showing a Moire distance measuring apparatus 10 according to the present invention. An optical system for projecting an image of a first grating 12 onto a diffusely reflecting surface 14 includes a light source 16, a condenser lens 18, and a projector lens 20. The optical axis 22 of the projector lens 20 is arranged at angle $\theta$ from a normal 24 to the surface 14. The first grating may comprise for example a Ronchi ruling having a pitch of 40 lines per mm. A second optical system comprising a viewing lens 26, having an optical axis 28 arranged at the angle $\theta$ with respect to the normal 24 forms an image of the projected image on a second grating 30. The image on the grating 30 and the grating itself form a Moire pattern. The Moire pattern is focused onto a sensor 32 by a lens 34.

The apparatus functions by detecting changes in the Moire pattern as the surface 14 is moved in a direction parallel to the normal 24. Several methods may be employed to detect the changing Moire pattern.

According to the simplest method, the image of the first grating formed by lens 26 on grating 30, and grating 30 are congruent (i.e. have the same pitch and are aligned in parallel). The resulting Moire pattern is a uniform field that changes from bright to dark as the surface 14 is moved in a direction parallel with normal 24. The observed pattern will change from bright to dark to bright (i.e. shift by one fringe period) when the surface 14 moves one contour interval c.

Deriving the relationship between the contour interval c and the system geometry is straight forward. The surface 14 has moved one contour interval c when the image of the projected grating is displaced relative to the viewing grating 30 by the pitch of the gratings. The pitch $P_0$ of the projected grating on the surface 14 is:

$$P_0 = mP \qquad (1)$$

where,
P = the pitch of grating 12
l = the distance from lens 20 to the diffuse surface 14
m = the magnification = $(1-f)/f$ and
f = the focal length of lens 20.

As the surface 14 is moved along normal 24, the image of the projected grating 12 on the surface 14 will appear to shift from side to side because this pattern will remain centered on the optic axis of the projection lens. The shift s will be:

$$s = d \tan(\theta) \qquad (2)$$

where d is the displacement of the surface 14. Even though the Moire pattern is formed by the superposition of the image of this projected pattern with the second grating 30, it is easier to visualize that the Moire pattern is formed on the diffuse surface 14. This will not introduce any error in the analysis. The symmetry of the arrangement shown in FIG. 1 calls for a second grating 30 with the same period as the first grating 12. The image of this second grating 30 of the surface 14 will have the same period but opposite shift as the first grating 12 when surface 14 is moved. One contour interval c is defined to be the longitudinal motion of surface 14 required to shift the two grating images relative to each other by one period $P_0$. For a displacement of a contour interval c, each grating will shift by $P_0/2$; therefore $$P_0/2 = c \tan(\theta)$$

or $\qquad (3)$ $c = P_0/2 \tan(\theta) = mP/2 \tan\theta$

The Moire pattern will change from bright to dark to bright as the surface 14 translates. While an arrangement symmetric about the normal 24 has been described for simplicity, non-symmetric arrangements can be employed, and each will have a contour interval specific to that arrangement.

In the simple example disclosed above, the distance traversed by surface 14 is measured by sensing the Moire pattern with a simple photocell 32 and counting the number of transistions from bright to dark. Each transition represents a movement of one contour interval c, and total displacement of the surface 14 can be measured with an accuracy of ±c. A system employing a 40 line/mm grating (12, 30) 105 mm lenses (20, 26) and a 6° angle $\theta$ will have a resolution of about ±6.6 mm at a distance of 6 meters from the surface 14.

There are several ways that the accuracy of the distance measurement can be increased. In one method, analogous to phase shifting interferometry, the first or second grating 12 or 30 is mechanically displaced, for example, by a piezoelectrical driver 36 shown schematically in FIG. 1 in ¼ pitch steps to provide a relative phase shift between the projected image and the second grating 30. A plurality of measurements of the brightness of the Moire pattern are made at each displacement of the surface 14, and the relative phase of the grating is computed from the sensor readings, note that only 1 sensor is needed. Moire fringes due to tilt in the surface 14 or small differences in the magnification in the two arms of the detector do not affect the measured relative phase unless the fringes are smaller than the area viewed by detector 32 which implies that the detector has to be smaller than the Moire fringes. In addition, the detector has to be larger than a few grating lines so that the grating is not resolved.

In the simple measurement method described previously, the direction of movement of the surface 14 would not be detected from the measurement. In the phase shifting method; the direction of movement is a straight forward result of the data analysis and is determined by whether the phase is increasing or decreasing between measurements.

Data analysis for a three-sample-phase shifting system will now be described, it being noted that methods employing step sizes other than ¼ pitch steps or four or more sampler for increased accuracy are known, and can also be employed. To gather the data for the phase shifting technique, a sample A is taken by the sensor 32, the moveable grating 30 is displaced by ¼ pitch, a sample B is taken by sensor 32, and the moveable grating 30 is displaced further by ¼ pitch and a third sample C is taken by sensor 32. The three measurements A, B, and C can be described as shown in equations 4, 5, 6 below:

$A = I_0 + a(\cos(\phi))$ (4)

$B = I_0 + a(\cos(\phi + \pi/2)) = I_0 + a(-\sin(\phi))$ (5)

$C = I_0 + a(\cos(\phi + 3\pi/2)) = I_0 + a(-\cos(\phi))$, (6)

where $I_0$ is the DC level and a is a magnitude of the Moire pattern, both of which drop out of the calculations. The tangent of $\phi$ is then calculated as follows:

$$\tan(\phi) = \frac{2\{I_0 + a(-\sin(\phi))\} - \{I_0 + a(-\cos(\phi))\} - \{I_0 + a(\cos(\phi))\}}{\{I_0 + a(-\cos(\phi))\} - \{I_0 + a(\cos(\phi))\}} \quad (7)$$

$$= -2a\sin(\phi)/(-2a\cos(\phi))$$

$$= (2B - C - A)/(C - A)$$

$$\to \phi = \tan^{-1}\{(2B - C - A)/(C - A)\}$$

Equation 7 gives the absolute phase of the Moire pattern at any point in the movement of the surface 14. The distance the surface has moved (x) is given by:

$$x = \frac{\phi}{2\pi} c + jc \quad (8)$$

where j is an integral number that is determined by counting the number of times the phase change passes through $2\pi$, since the phase changes repeat every $2\pi$. A direction ambiguity and or a missed count will occur if the surface velocity exceeds (c/z)/sample which corresponds to a phase change of $\pi$/sample.

Figure 2:
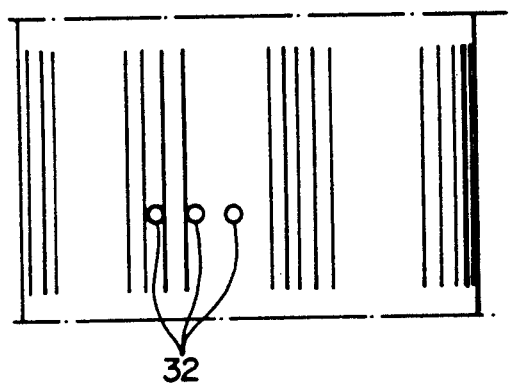
FIG. 2 is a diagram showing the arrangement of sensors in a spatial synchronous detection method according to the one embodiment of the present invention.

Another method of sensing the change in the Moire pattern is analogous to spatial synchronous detection interferometry. For example, see U.S. Pat. No. 4,776,698 issued Oct. 11, 1988 to Crosdale. In this method, the Moire pattern is made to exhibit a plurality of fringes, for example by tilting the surface 14, or by providing slightly different magnifications between the lenses 20 and 26. A plurality of detectors placed 90 degrees of spatial phase apart (¼ fringe) view the Moire pattern, as shown in FIG. 2. The signals from the sensor are processed as described above with respect to the phase shift measurement. This approach is sensitive to slight changes in the tilt of surface 14, since this will cause a change in the spacing of the Moire fringes. As noted above, techniques employing four or more sensors are known which improve the accuracy of the spatial synchronous detection.

With either the phase shifting technique or the spatial synchronous detection techniques described above, it is possible to detect fringe shifts of 0.01 and hence to detect distance changes to within ±0.01 contour intervals. For the examples noted above with 40-line per mm gratings, 105 mm lenses, and 6 degree $\theta$, this would result in a measurement accuracy of about ±70 microns at 6 meters.

Figure 3:
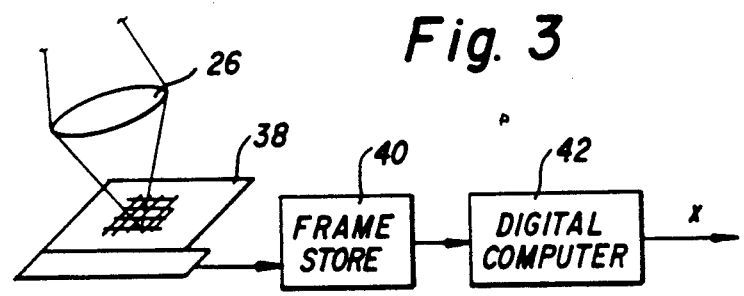
FIG. 3 is a schematic diagram showing the use of a regular sensor array to take the place of the sensor grating.

As shown in FIG. 3, a regularly spaced detector array such as a CCD image sensor 38 with a spacing of 1 pixel/grating line may also be employed to take the place of the grating 30, the Moire pattern being formed by the interaction between the spaced detectors in the array and the projected image of the grating 12 onto the sensor. Such a detector can comprise a video camera with or without an image frame grabber 40. The fringe pattern may be monitored by a programmed digital computer 42, and the fringe centers located to determine the longitudinal motion x of the surface. A field of regularly spaced Moire fringes can be generated by rotating the projected grating slightly with respect to the viewing grating or regularly spaced detector. This technique can be used for any detection scheme that requires a Moire fringe pattern.

INDUSTRIAL APPLICABILITY AND ADVANTAGES

The Moire distance apparatus of the present invention is useful for measuring the displacement of parts having diffusely reflective surfaces, for example in an automated production line. The invention has the advantage over the prior art measurement method in that a large specularly reflective surface is not required for performing the measurement.

We claim:

1. Moire distance measurement apparatus, comprising;
   a. means including a light source, a grating, a condenser lens between the light source and the grating, and a projection lens after the grating for projecting an image of the grating onto a diffusely reflecting surface;
   b. means including a viewing lens for forming an image of said projected image on a second grating to generate a Moire pattern; and
   c. means for sensing a temporal change in said Moire pattern as the surface is moved to determine the distance that the surface is moved.

2. The apparatus claimed in claim 1, wherein said formed image of said first grating and said second grating are congruent, whereby the Moire pattern is a uniform field and a motion of the surface results in a change in the uniform field Moire pattern from bright to dark and the means for sensing a temporal change in said Moire pattern is a sensor for sensing the changes of a Moire pattern from bright to dark and counting the number of changes.

3. The apparatus claimed in claim 2, further comprising means for providing relative movement between said formed image and said second grating in fractional pitch steps, and said means for sensing a temporal change in said Moire pattern includes means for performing phase shifting measurements of the phase of said Moire pattern at first and second positions of the surface.

4. The apparatus claimed in claim 1, wherein said formed image of said first grating and said second grating differ in pitch, whereby the Moire pattern is a multiple fringe pattern, and said means for sensing the temporal change in the phase of the Moire pattern includes means for performing spatial synchronous detection, including a plurality of sensors spaced 90 degrees apart with respect to the period of said Moire pattern.

5. The apparatus claimed in claim 1, wherein said means for sensing a temporal change in said Moire pattern comprises an array of image sensing elements and wherein said second grating is defined by the spacing of said sensor elements in said array.

6. A method of Moire distance measurement comprising the steps of;
   a. projecting an image of a grating onto a diffusely reflecting surface employing a light source, a condenser lens between the light source and a grating and a projector lens between the grating and the diffusely reflective surface;
   b. forming an image of said projected image on a second grating employing a viewing lens to form the image to generate a Moire pattern; and
   c. sensing a temporal change in said Moire pattern as the surface is moved and determining the distance that the surface is moved based upon the change.

7. The method claimed in claim 6, wherein said formed image of said first grating and said second grating are congruent, whereby the Moire pattern is a uniform field and a motion of the surface results in a change in the uniform field Moire pattern from bright to dark and the step of sensing a temporal change in said Moire pattern comprises sensing the changes of a Moire pattern from bright to dark and counting the number of changes.

8. The method claimed in claim 7, further comprising the step of providing relative movement between said formed image and said second grating in fractional pitch steps, and said step of sensing a temporal change in said Moire pattern includes performing phase shifting measurements of the phase of said Moire pattern at first and second positions of the surface.

9. The method claimed in claim 6, where said formed image of said first grating and said second grating differ in pitch, whereby the Moire pattern is a multiple fringe pattern, and said step of sensing the temporal change in the phase of the Moire patterns includes performing spatial synchronous detection with a plurality of sensors spaced 90 degrees apart with respect to the period of said Moire pattern.

10. The method claimed in claim 6, wherein said step of sensing a change in said Moire pattern comprises sensing the temporal change with an array of image sensing elements and wherein second grating is defined by the spacing of said sensor elements in said array.

* * * * *